United States Patent [19]
Hara et al.

[11] Patent Number: 6,067,420
[45] Date of Patent: May 23, 2000

[54] APPARATUS HAVING SHAKE CORRECTION FUNCTION

[75] Inventors: Yoshihiro Hara, Kishiwada; Keiji Tamai, Suita; Tomonori Satoh, Sakai, all of Japan

[73] Assignee: Minolta Co., Ltd., Osaka, Japan

[21] Appl. No.: 09/132,959

[22] Filed: Aug. 12, 1998

[30] Foreign Application Priority Data

Aug. 15, 1997 [JP] Japan .................................. 9-220395

[51] Int. Cl.$^7$ .................................................. G03B 17/00
[52] U.S. Cl. ................................................................ 396/55
[58] Field of Search ........................................... 396/52–55

[56] References Cited

U.S. PATENT DOCUMENTS

| | | | |
|---|---|---|---|
| 5,615,397 | 3/1997 | Shiomi et al. | 396/55 |
| 5,701,521 | 12/1997 | Ohishi et al. | 396/55 X |
| 5,740,473 | 4/1998 | Tanaka et al. | 396/55 |

*Primary Examiner*—W. B. Perkey
*Attorney, Agent, or Firm*—Sidley & Austin

[57] ABSTRACT

A mode setter 92 causes a shake sensor controller 43 and a shake amount detector 51 to execute a routine of low-speed control when the switch S1 is ON, and a routine of high-speed control when the switch S2 is ON. A display signal generator 121 generates a display signal based on the shake amounts obtained through a prescribed number of detections by the shake amount detector 51. A display 122 has multiple types of LEDs that illuminate in response to a display signal generated by the display signal generator 121 when the switch S1 is ON.

26 Claims, 7 Drawing Sheets

FIG. 5
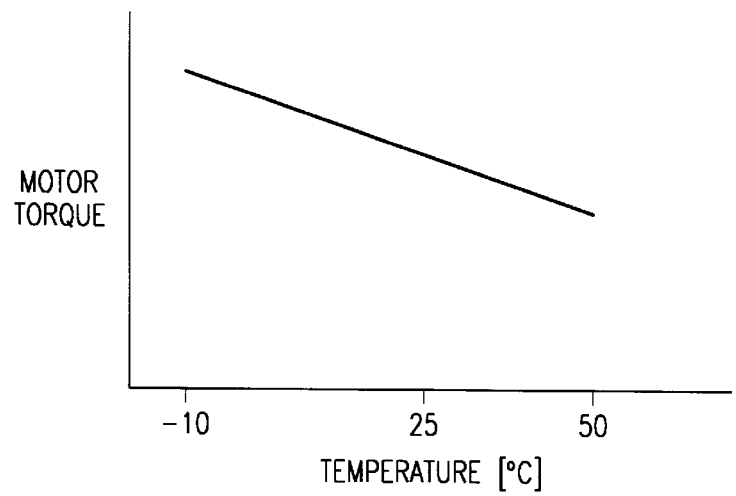
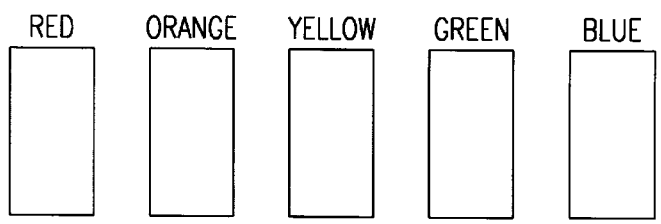
FIG. 6a
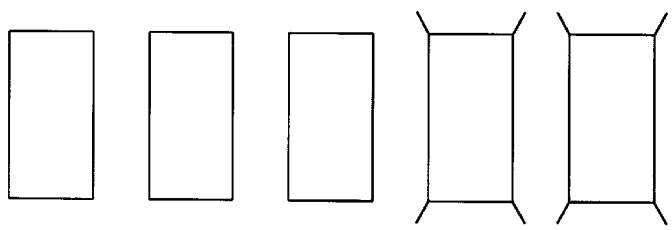
FIG. 6b
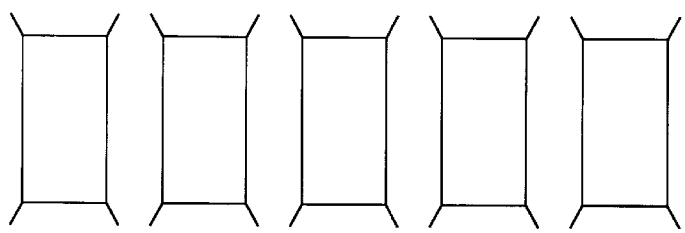
FIG. 6c
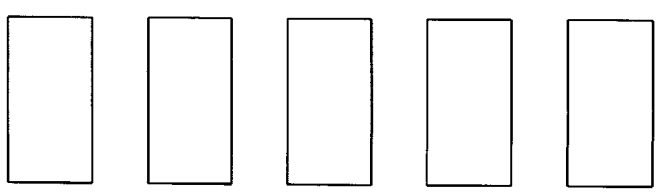
FIG. 6d

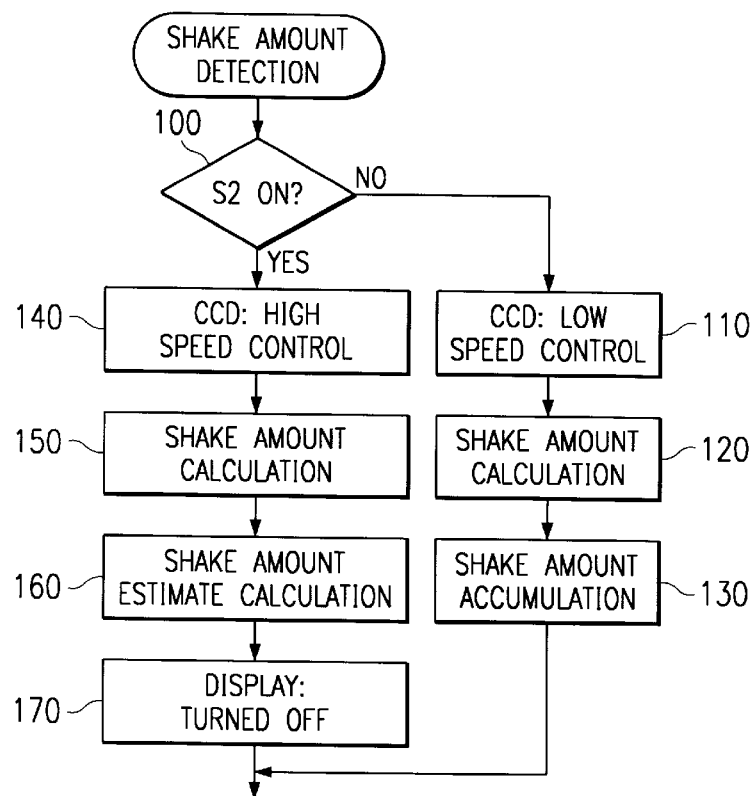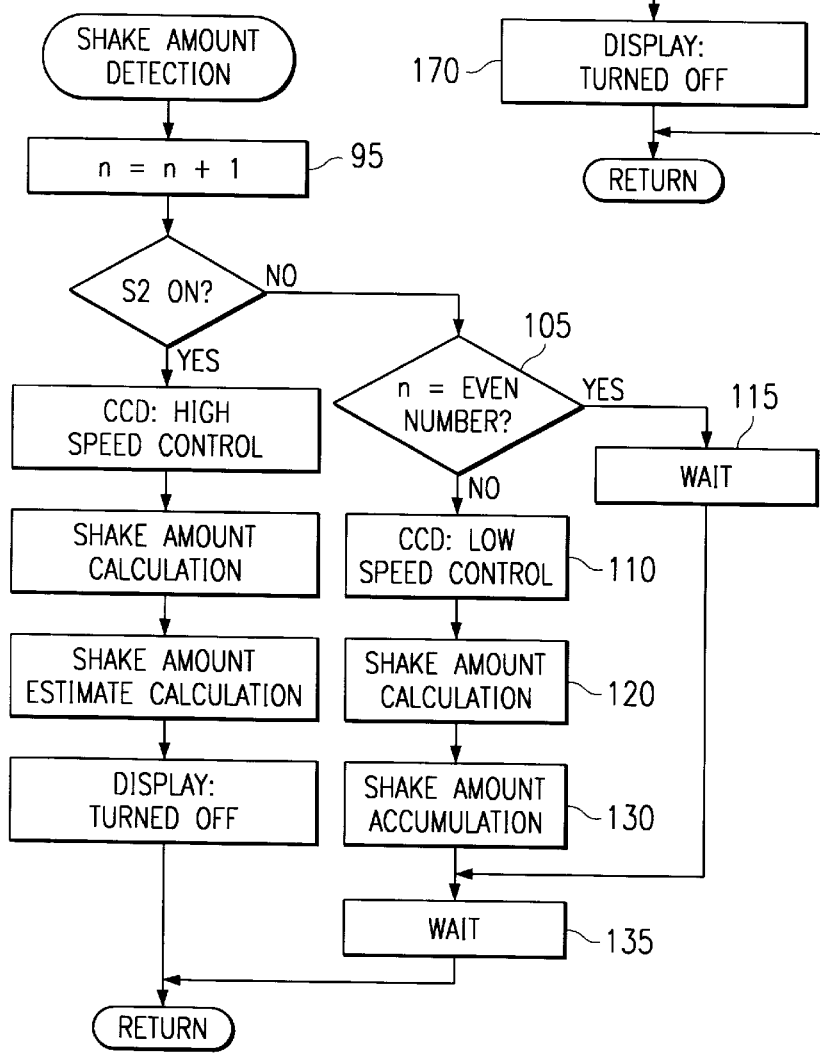

APPARATUS HAVING SHAKE CORRECTION FUNCTION

This application is based on application No. Hei 9-220395 filed in Japan, the content of which is hereby incorporated by reference.

BACKGROUND OF THE INVENTION

1. Field of the Invention

The present invention pertains to an apparatus that detects its own instability and performs prescribed processing regarding said instability based on the detected shake amounts.

2. Description of the Prior Art

When taking a photograph, instability or camera shake of the camera relative to an object caused by hand shake is one obstacle to taking a proper photograph. This camera shake is known through experience to have essentially common characteristics. Therefore, by detecting this instability, its effect can be effectively eliminated.

In addition, when performing viewing through binoculars, instability of the binoculars relative to the viewing object caused by hand shake is one factor that hinders clear observation.

In recent years, a camera has been proposed that detects by means of a CCD (charge coupled device) area sensor the degree of instability of the camera relative to the object due to hand shake and that performs shake correction by driving a correction lens such that the shake will be eliminated. In other words, as the object image is repeatedly received by the area sensor, the captured image data is sent to the shake amount detector. This shake detector first extracts and specifies a base image from the object image that is first transmitted to it. Reference images that correspond to the base image are extracted from the object image data that is sequentially received and sent to the detector, such that the changes (shake) between the base image and reference images may be detected in terms of a number of CCD pixels. Next, using the shake amounts thus obtained, an estimated shake amount is calculated based on the time that will elapse between the time at which the detections were performed and the time at which the correction lens is driven. By driving the correction lens in accordance with the estimated shake amount thus obtained, the movement in the object image due to hand shake is effectively eliminated.

When preparatory photo-taking operations are performed, said shake detection and shake amount calculation operations are repeatedly performed. When the shutter release operation is then performed, during the exposure period, while shake detection and shake calculation are performed, calculation of an estimated shake amount is also carried out, data corresponding to the estimated shake amount is set in the drive unit, and the correction lens is caused to carry out the shake correction operation.

In said conventional camera, shake detection and shake amount calculation are performed both during photo-taking preparation and during exposure, without differentiating between the two, but shake correction is not actually performed during the photo-taking preparation period.

Given that the shake detection cycles are relatively short in order to perform shake correction with high accuracy while keeping up with hand shake and that the camera is driven by a battery housed in it, performing the same operations during photo-taking preparation that are performed during actual exposure leads to wasteful power consumption.

Displaying the repeatedly-obtained shake amounts on a monitor is desirable because the operator can be notified of the existence of hand shake and his attention can be called to this fact before photo-taking is performed. However, if the shake amount is displayed each time shake calculation is performed, the display will change frequently. This makes the displayed values hard to discern and existence of hand shake difficult to confirm.

SUMMARY OF THE INVENTION

The object of the present invention is to attain an apparatus that resolves said problems.

Another object of the present invention is to provide an apparatus that can perform operations pertaining to shake detection in response to the current operation mode of the apparatus, e.g., the photo-taking preparation mode or exposure mode in the case of a camera.

In order to attain said objects, one aspect of the present invention includes a detector that detects the instability of an apparatus relative to the object; a calculator that determines a shake value to be used to perform processing regarding said instability, using the shake detected by means of said detector; a controller that performs processing regarding said instability using said value; and a mode selector that alternates between a first mode in which at least one of said detector and calculator is caused to operate in accordance with a first set of parameters and a second mode in which at least one is caused to operate in accordance with a second set of parameters different from said first parameters.

Using this construction, the apparatus is set to operate in either the first mode or second mode, and therefore, if different modes are used when the shake situation is to be read only and when shake correction is performed, the shake situation can be read more easily and appropriate shake correction may be carried out.

Another aspect of the present invention includes a display that displays the shake value and a shake correction mechanism that performs shake correction using that shake value, wherein in said first mode, the calculator and/or controller perform shake detection and/or determination of values to cause said values to be displayed in said display, while in said second mode, the calculator and/or controller perform shake detection and/or determination of shake values to cause said shake correction mechanism to operate. Using this construction, different modes are used when shake values are displayed only and when shake correction is carried out. Consequently, the values, e.g., the degree of instability, can be read with increased ease and appropriate shake correction can be carried out.

In yet another aspect of the present invention, during said display in said first mode, shake detection is performed using longer cycles than in the second mode. Using this construction, shake values are obtained using longer shake detection intervals than in the second mode (slow-speed shake detection), and therefore, the speed of the shake value display update slows down, making the displayed values easier to read.

In yet another aspect of the present invention, during said display in said first mode, the shake value determination is carried out using multiple items of shake information detected by said detector. Using this construction, the shake value determination is performed using multiple items of shake information (shake amounts, for example), and therefore, compared with when a shake value is determined using a single item of shake information, the speed of the shake value display update slows down, making the displayed shake values easier to read.

In yet another aspect of the present invention, during said display in said first mode, the speed at which the shake information detected by the detector is sent to the calculator is made slower than in said second mode. Using this construction, the shake information (image information, for example) is received by the calculator at a slower speed than in the second mode, and therefore, value determination takes place at a slower speed than in the second mode and the speed of the shake value display shake update slows down, making the displayed values easier to read.

In yet another aspect of the present invention, during said display in said first mode, the shake information detected by said detector is thinned, and a value is determined using the thinned shake information. Using this construction, the shake value determination is performed using thinned shake information (image information or shake amounts, for example), and therefore, the speed of the shake value display update slows down in comparison with when non-thinned shake information is used, making the displayed shake values easier to read.

In yet another aspect of the present invention, during the operation of the shake correction mechanism in said second mode, shake detection is performed using shorter cycles than in the first mode. Using this construction, shake values are obtained in higher-speed shake detection than in the first mode, and as a result, accurate shake correction can be carried out.

In yet another aspect of the present invention, during the operation of the shake correction mechanism in said second mode, the speed of the transfer of shake information from the detector to the calculator is faster than in the first mode. Using this construction, shake information is received by the calculator at a faster rate than in the first mode, and therefore, value determination takes place faster than in the first mode and accurate shake correction can be carried out.

In yet another aspect of the present invention, the calculator calculates in the second mode an estimated shake amount as the shake value to be used when performing processing. Using this construction, the apparatus' performance in continuously handling the instability becomes more accurate.

In yet another aspect of the present invention, the apparatus is a camera, and said mode selector switches from the first mode to the second mode in response to the instruction to begin exposure. Using this construction, the display of shake values such as the shake amounts is performed with low power consumption before exposure, and shake correction is carried out during exposure.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIG. 5 is a chart showing the motor torque characteristics relative to temperature, which comprises one factor related to the change in drive characteristics.

FIG. 6 is a drawing of examples of illumination in the display, showing different horizontal shake situations.

FIG. 8 is a flow chart showing the 'shake detection' subroutine of FIG. 7.

FIG. 11 is a flow char showing the 'shake detection' subroutine of FIG. 10.

DETAILED DESCRIPTION OF THE PREFERRED EMBODIMENT

Figure 1:
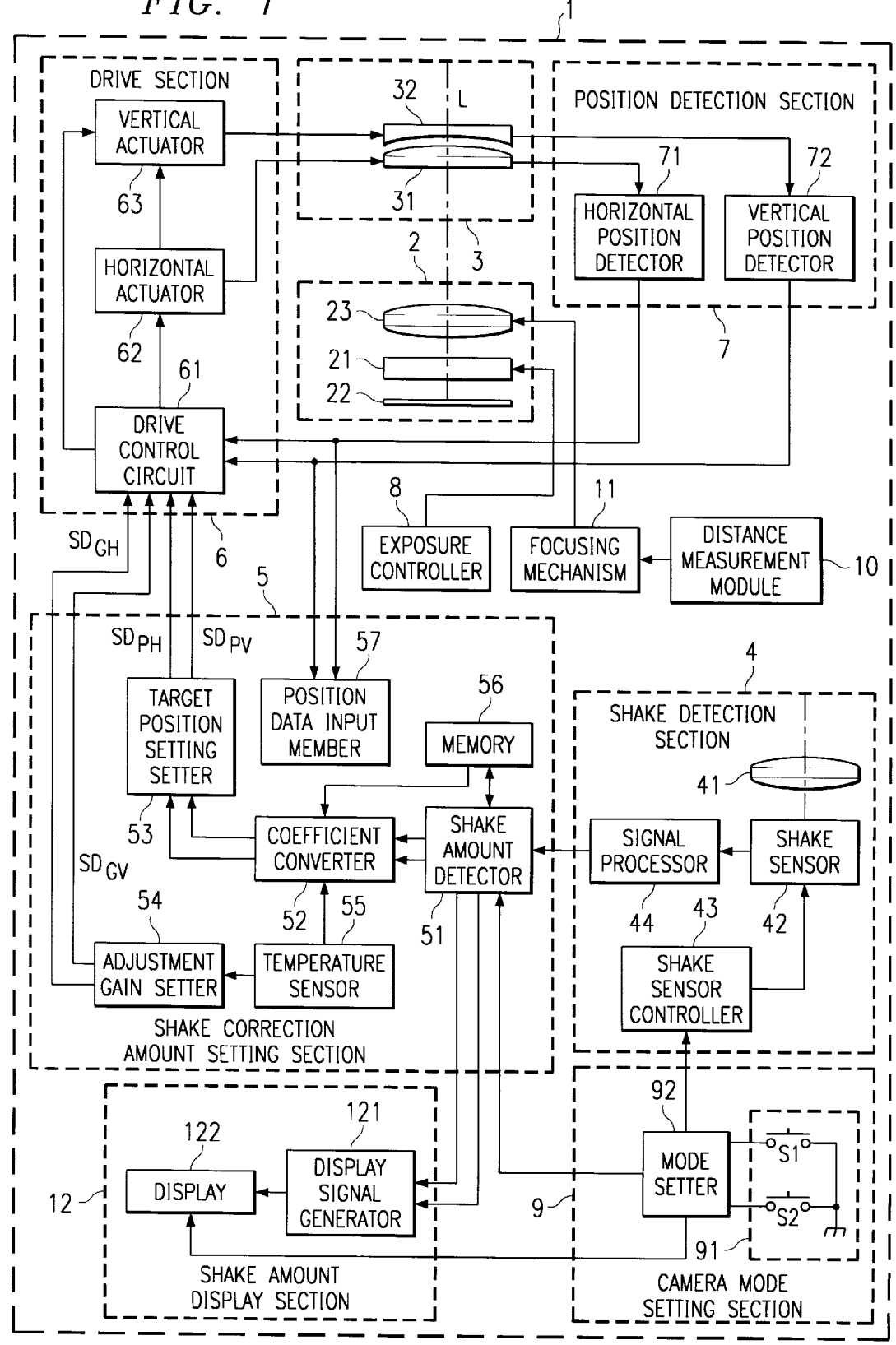
FIG. 1 is a block diagram of one embodiment of the present invention.

FIG. 1 is a block diagram of one embodiment of the present invention. Camera 1 comprises an image recording section 2, a correction lens unit 3, a shake detection section 4, a shake correction amount setting section 5, a drive section 6, a position detection section 7, an exposure control section 8, a camera mode setting section 9, a distance measurement module 10, a focusing section 11 and a shake amount display 12.

The image recording section 2 includes an image recording lens 21 having an optical axis L, a mechanism not shown in the drawing that feeds the film 22 mounted in the camera to the image forming position on the optical axis L, and a shutter 23 located in front of the film 22, which captures the object image.

The correction lens unit 3 comprises a horizontal shake correction lens 31 and a vertical shake correction lens 32 located in front of the image recording lens 21. Said lenses correct camera shake through refraction. The horizontal shake correction lens 31 and the vertical shake correction lens 32 each have an optical axis parallel to the optical axis L, and are supported on the plane perpendicular to the optical axis L such that they can be moved horizontally and vertically respectively, i.e., perpendicularly to each other.

The shake detection section 4 comprises a detection lens 41, a shake sensor 42, a shake sensor controller 43 and a signal processor 44, and obtains image data used to detect the object image shake caused by the instability of the camera 1 relative to the object. The detection lens 41 has an optical axis parallel to the optical axis L of the image recording lens 21, and forms an object image on the shake sensor 42 behind it. The shake sensor 42 is an area sensor in which photoelectrical conversion elements such as CCDs (charge coupled devices) are aligned in a two-dimensional fashion. It receives the object image formed by means of the detection lens 41 over a prescribed integration time and outputs an electric signal that corresponds to the amount of received light. The image signal for the object image is obtained as a planar aggregate of the pixel signals that comprise electric signals obtained by the photoelectric conversion elements when light is received.

The shake sensor controller 43 causes the shake sensor 42 to perform a light receiving operation for a prescribed electric charge accumulation period (integration time). The shake sensor controller 43 also causes the pixel signals obtained in the light receiving operation to be outputted to the signal processor 44 using either low-speed or high-speed control that is set by means of the camera mode setting section 9. Low-speed and high-speed controls are explained below when the camera mode setting section 9 is explained.

The signal processor 44 carries out prescribed processing of the pixel signals sent from the shake sensor 42 (signal amplification and offset adjustment) as well as A/D conversion, converting them into pixel data.

The shake correction amount setting section 5 comprises a shake amount detector 51, a coefficient converter 52, a target position setter 53, an adjustment gain setter 54, a temperature sensor 55, a memory 56 and a position data input member 57. The shake correction amount setting section 5. It sets data to generate a drive signal that will be sent to the drive section 6. The temperature sensor 55 detects the ambient temperature around the camera 1. The memory 56 comprises a RAM that temporarily stores the image data used by the shake amount detector 51 and other data such as shake amounts, and a ROM that stores such things as conversion coefficients used by the coefficient converter 52.

The shake amount detector 51 dumps the image data from the signal processor 44 into the memory 56. The shake amount detector 51 then seeks the shake amount using the dumped image data and stores it in the memory 56, and then seeks an estimated shake amount using the shake amounts stored in the memory 56. In other words, the shake amount detector 51 extracts an image that corresponds to the base image as a reference image from the latest image data dumped into the memory 56, and carries out calculation to seek a shake amount, in terms of a number of pixels, from the change in position of the reference image relative to the base image. A shake amount is sought in both the horizontal and vertical directions.

Figure 2:
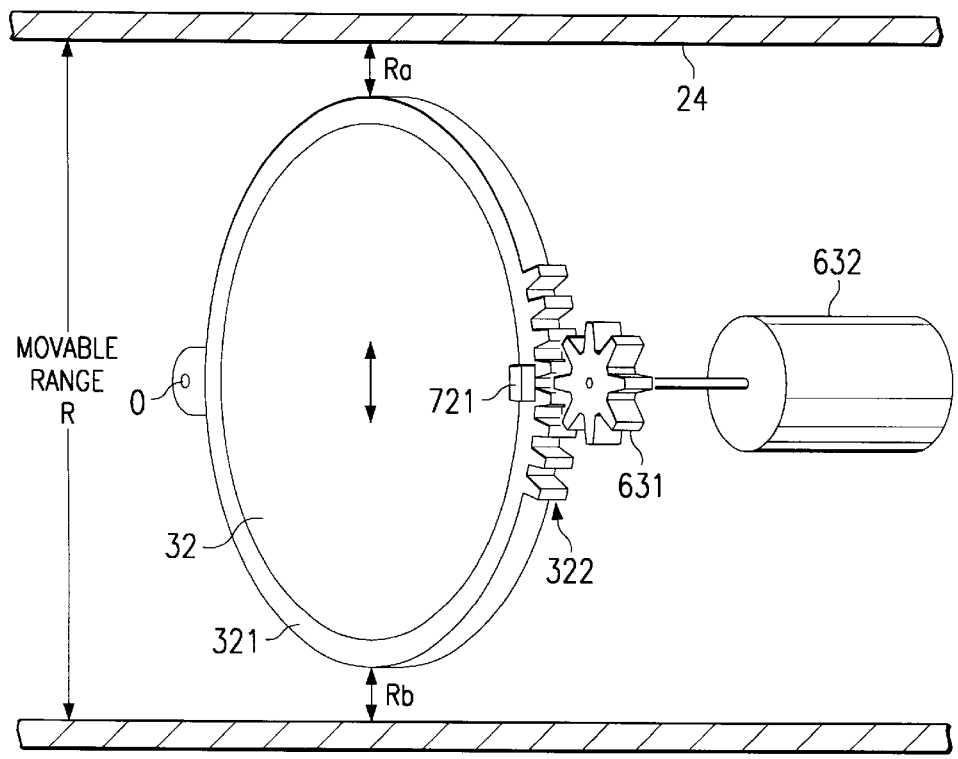
FIG. 2 is a perspective view of a vertical shake correction lens and other components housed in the lens mount, which are shown to explain a reference image.

FIG. 2 is a perspective view showing a mechanism including the vertical shake correction lens 32 housed in a lens mount, said drawing being shown in order to explain said base image. In this embodiment, the vertical shake correction lens 32 is housed inside a lens mount 24 and is mounted to a frame 321 which is supported rotatably at a fulcrum O. On the opposite side from the fulcrum O and on the outer circumference of the frame 321 is formed a gear 322. When a motor 632 having a gear 631 that engages with this gear 322 is driven, the vertical shake correction lens 32 moves essentially vertically. As can be understood from FIG. 2, the vertical shake correction lens 32 can move essentially vertically within the movable range R, which comprises the inner diameter of the lens mount 24. A similar mechanism is also used for the horizontal shake correction lens.

A base image is an image that is included in the image data taken from the shake detection section 4 when the lenses of the correction lens unit 3 are set at prescribed standard positions, i.e., when the lenses are set at positions at which each of them has an equal distance over which they can travel in either direction in their respective movable range, or is centered (in FIG. 2, this is a position at which Ra equals Rb). By having the position at which the lenses are centered be the standard position, the problem that the lens comes to the end of the movable range quickly when one distance is shorter than the other can be avoided.

Figure 3:
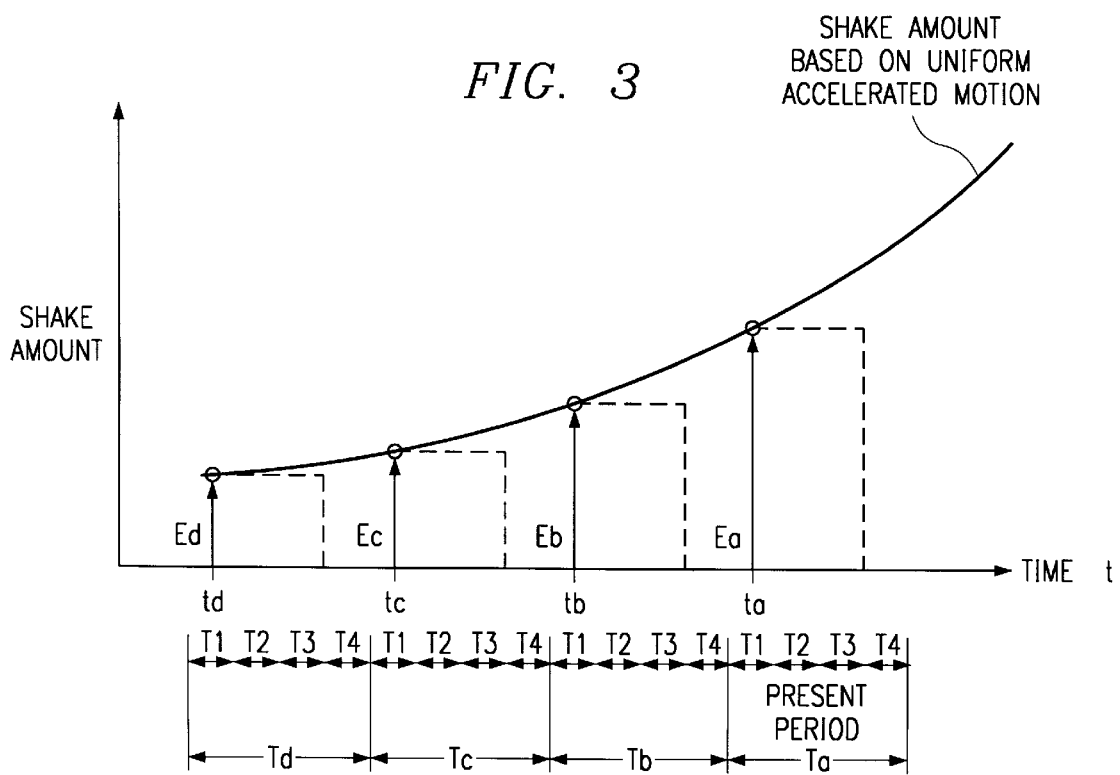
FIG. 3 is a drawing to explain the calculation of an estimated shake amount.

FIG. 3 is a drawing to explain the estimated shake amount calculation. First, four shake amounts including the latest shake amount (Ea) are selected and extracted from the memory 56 with regard to both the horizontal and vertical directions. The time progresses in the order of t(d) to t(a), and each time point indicates the midpoint of its corresponding integration time T1. The arrow pointing upward at each time point indicates the shake amount relative to the standard position, and each shake amount is stored in the memory 56. Time T2 is the time period required for the image data to be taken out of the shake sensor 42 and dumped in the memory 56. Time T3 is the time period required for the shake amount detector 51 to obtain the shake amount. Time T4 is the time period required for the shake amount detector 51 to calculate an estimated shake amount.

Next, a shake speed V1 is sought from the latest shake amount (Ea) and a past shake amount (Eb) using a formula 1. A shake speed V2 is sought from the remaining two past shake amounts (Ec) and (Ed) using a different formula 2. The rate of acceleration (A) is then sought from the shake speeds V1 and V2 using yet another formula 3.

$$V1=(Ea-Eb)/(ta-tb) \quad (1)$$

$$V2=(Ec-Ed)/(tc-td) \quad (2)$$

$$A=(V1-V2)/(ta-tc) \quad (3)$$

After the calculations are made, assuming that the instability due to hand shake will change in accordance with uniformly accelerated motion, an estimated shake amount (Ep) is calculated from the latest shake amount (Ea), shake speed V1 and shake acceleration rate (A) using a formula 4.

$$Ep=Ea+V1 \times Tp+\tfrac{1}{2} \times k \times A \times Tp^2 \quad (4)$$

The constant k (0<k<1) is used to approach the actual hand shake and Tp=(½)×T1+T2+T3+T4+Td. The time (Td) is the time that elapses from the time at which an estimated shake amount (Ep) is sent from the shake amount detector 51 to the time at which the driving of the correction lens unit 3 is completed based on the drive signal obtained from the estimated shake amount (Ep).

This shake amount detector 51 executes processing using low-speed or high-speed control in accordance with the setting by means of the camera mode setting section 9 described below. Where low-speed control is present, the shake amount detector 51 seeks a shake amount using the image data dumped in the memory 56 and sends the shake amount to the shake amount display 12. On the other hand, where high-speed control is present, the shake amount detector 51 seeks a shake amount using the image data dumped in the memory 56 and stores it in the memory 56. The shake amount detector 51 then seeks an estimated shake amount using shake amounts selectively extracted from those stored in the memory 56 and sends it to the coefficient converter 52. This is done because in the case of high-speed control, the estimated shake amount is put to actual use for the purpose of shake correction, and therefore, it is necessary to carry out the processes by the shake detection section 4 and shake amount detector 51 at a high speed in order to accurately keep up with the actual hand shake.

The coefficient converter 52 shown in FIG. 1 converts the horizontal and vertical estimated shake amounts into horizontal and vertical target angular positions for the correction lens unit 3 using conversion coefficients stored in the memory 56. The coefficient converter 52 also calculates an adjustment coefficient in accordance with the ambient temperature detected by the temperature sensor 55, and adjusts the horizontal and vertical target angular positions using this adjustment coefficient. This adjustment coefficient is used to adjust for the change in the focal length of the detection lens 41 and in the light refractive index (refractive power) of the correction lens unit 3, which occurs as the ambient temperature changes.

The target position setter 53 converts the adjusted horizontal and vertical target angular positions into target positions (positions at the completion of driving). The horizontal and vertical target positions are set in the drive section 6 as data $SD_{PH}$ and $SD_{PV}$, respectively.

The adjustment gain setter 54 seeks horizontal and vertical gain adjustment amounts in accordance with the ambient temperature detected by the temperature sensor 55 and sets them in the drive section 6 as data $SD_{GH}$ and $SD_{GV}$, respectively. The horizontal and vertical gain adjustment amounts adjust the horizontal and vertical basic gains. The data $SD_{GH}$ and $SD_{GV}$ and basic gain details are described below.

The position data input member 57 performs A/D conversion of the output signals from the position detection section 7, and monitors the positions of the horizontal shake correction lens 31 and vertical shake correction lens 32 using the output data thus obtained. By monitoring the position data, abnormalities in the drive mechanisms for the correction lens unit 3 may be detected.

The drive section 6 comprises a drive control circuit 61, a horizontal actuator 62 and a vertical actuator 63. The drive control circuit 61 generates horizontal and vertical drive signals based on the data $SD_{PH}$, $SD_{PV}$, $SD_{GH}$ and $SD_{GV}$ from the target position setter 53 and adjustment gain setter 54. The horizontal actuator 62 and the vertical actuator 63 each comprise a coreless motor, for example (see the motor 632 and gear 631 in FIG. 2), and drive the horizontal shake correction lens 31 and vertical shake correction lens 32 based on the horizontal and vertical drive signals generated by the drive control circuit 61.

Figure 4:
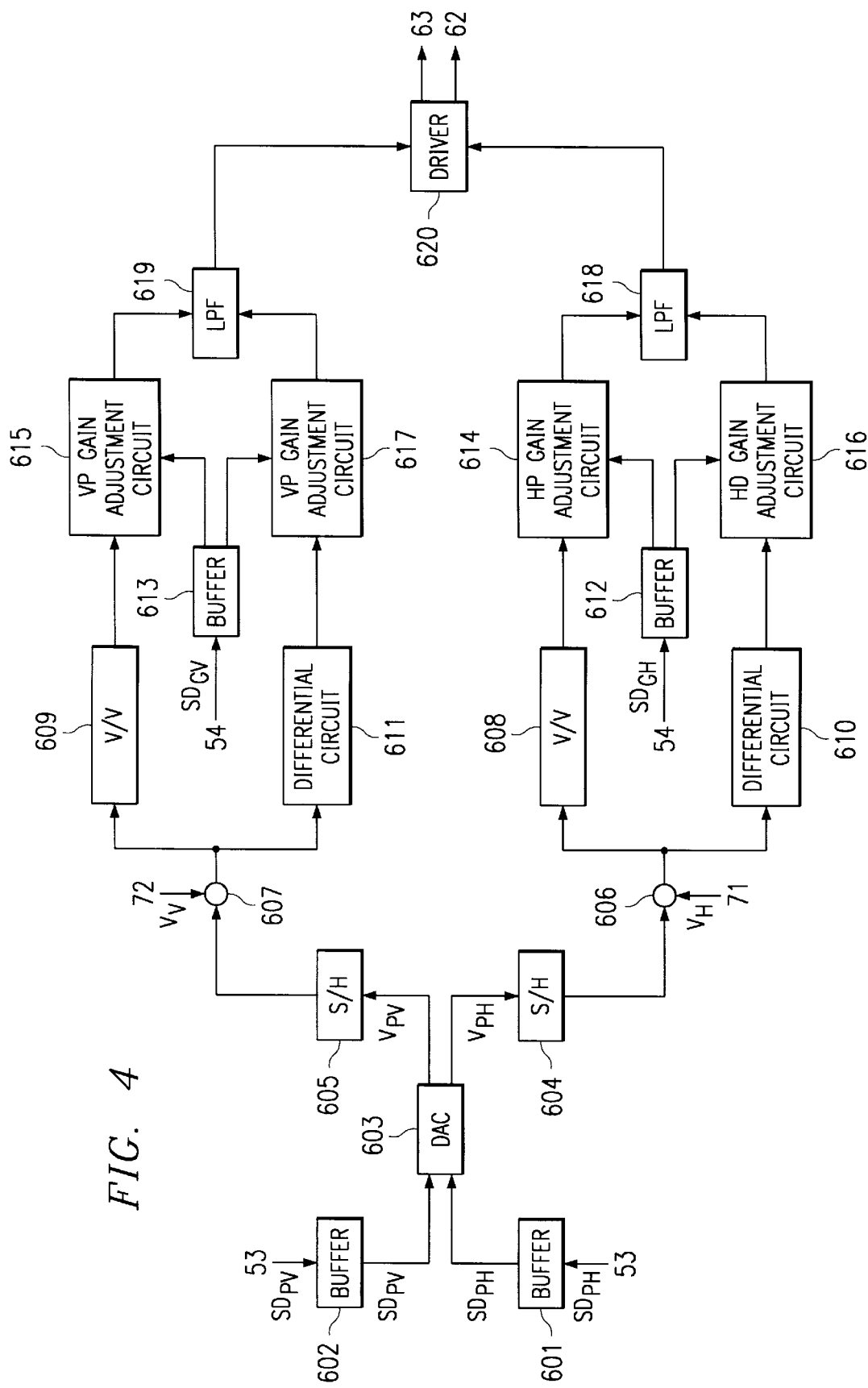
FIG. 4 is a block diagram showing one example of a drive control circuit comprising a part of a servo circuit.

FIG. 4 is a block diagram showing one example of the drive control circuit 61 that comprises a part of a servo circuit. The data $SD_{GH}$ and $SD_{GV}$ set in the drive control circuit 61 will be explained first. The camera 1 changes its various characteristics regarding the shake correction drive system when its ambient temperature changes. For example, as the ambient temperature changes, changes occur in the torque constant for each motor in the drive section 6 (see the motor 632 in FIG. 2), in the backlash of the drive systems (movable mechanisms) of the correction lens unit 3 and drive section 6, and in the stickiness of the gears of said drive systems (see the gear 322 and gear 631 in FIG. 2).

FIG. 5 shows a motor torque characteristic chart in relation to temperature. The torque is one factor in the change in the drive characteristics. As can be understood from FIG. 5, when the ambient temperature deviates from the base temperature (25° C. for example), the value of the motor torque becomes different from that at the base temperature. Consequently, the drive characteristics in connection with shake correction change. The drive characteristics obtained using the horizontal and vertical basic gains (the drive gains at the base temperature) therefore do not apply if the ambient temperature obtained by the temperature sensor 55 deviates from the base temperature.

Therefore, the adjustment gain setter 54 generates a gain adjustment amount to adjust for the change in the drive characteristics obtained using the horizontal and vertical basic gains, in accordance with the ambient temperature obtained by the temperature sensor 55. In this embodiment, functions to obtain gain adjustment amounts to individually adjust for changes in the motor torque, backlash and gear stickiness (the ambient temperature is the argument), which occur as the ambient temperature deviates from the base temperature, are predetermined in advance for both the horizontal and vertical directions. The ambient temperature detected by the temperature sensor 55 is then input into each adjustment function for both the horizontal and vertical directions and the aggregate of the values thus obtained is deemed the gain adjustment amount. The horizontal and vertical gain adjustment amounts are set in the drive control circuit 61 as data $SD_{GH}$ and $SD_{GV}$.

The drive control circuit 61 will now be explained. Although in FIG. 1 the data $SD_{GH}$ and $SD_{GV}$ are shown for the sake of convenience as if they were transmitted via two signal lines, in actuality, they are serially transmitted and set via two data lines not shown in the drawing (SCK and SD) and three control lines (CS, DA/GAIN and X/Y). Similarly, the data $SD_{PH}$ and $SD_{FV}$ are alternately sent to the drive control circuit 61.

Therefore, the drive control circuit 61 has a construction that includes buffers and sample hold circuits. In other words, in FIG. 4, buffers 601 and 602 are memories that store the data $SD_{PH}$ and $SD_{PV}$ that are alternately set by the target position setter 53.

DAC 603 is a D/A converter that converts the data $SD_{PH}$ set in a buffer 601 into a target position voltage $V_{PH}$. DAC 603 converts the data $SD_{PV}$ set in a buffer 602 into a target position voltage $V_{PV}$.

S/H 604 and S/H 605 are both sample hold circuits. The S/H 604 samples the target position voltage $V_{PH}$ converted by the DAC 603 and holds the sampled value until the next sampling occurs. Similarly, the S/H 605 samples the target position voltage $V_{PV}$ converted by the DAC 603 and holds the sampled value until the next sampling occurs.

Adding circuit 606 seeks the difference between the target position voltage $V_{PH}$ and the output voltage $V_H$ from the horizontal position detector 71. Adding circuit 607 seeks the difference between the target position voltage $V_{PV}$ and the output voltage $V_V$ from the vertical position detector 72. In other words, in the adding circuits 606 and 607, the difference in voltage can be obtained through addition because the output voltages $V_H$ and $V_V$ are obtained in the form of negative voltages by the horizontal position detector 71 and the vertical position detector 72.

V/V 608 amplifies the input voltage into a horizontal proportional gain voltage using a ratio preset for the base temperature. V/V 609 amplifies the input voltage into a vertical proportional gain voltage using a ratio preset for the base temperature. Here, the horizontal proportional gain is a gain that is proportional to the difference between the target position for the horizontal shake correction lens 31 and the position of said-lens detected by the horizontal position detector 71. The vertical proportional gain is a gain that is proportional to the difference between the target position for the vertical shake correction lens 32 and the position of said lens detected by the vertical position detector 72.

The differential circuit 610 performs differential calculation of the difference in voltage obtained by the adding circuit 606 using a time constant preset for the base temperature to obtain a horizontal differential gain voltage. The voltage thus obtained translates into the difference in horizontal speed (the difference between the target drive speed and the current drive speed). Similarly, the differential circuit 611 performs differential calculation of the difference obtained by the adding circuit 607 using a time constant preset for the base temperature to obtain a vertical differential gain voltage. The voltage thus obtained translates into the difference in vertical speed (the difference between the target drive speed and the current drive speed).

As described above, the proportional gains and differential gains are set as the basic gains for the base temperature by the V/V 608 and the V/V 609 and the differential circuits 610 and 611 for both the horizontal and vertical directions.

Buffer 612 is a memory to store the data $SD_{GH}$ from the adjustment gain setter 54. This data $SD_{GH}$ comprises gain adjustment amounts (proportional gain adjustment amount and differential gain adjustment amount) to adjust the horizontal basic gains (proportional gain and differential gain).

Buffer 613 is a memory to store the data $SD_{GV}$ from the adjustment gain setter 54. This data $SD_{GV}$ comprises gain adjustment amounts (proportional gain adjustment amount and differential gain adjustment amount) to adjust the vertical basic gains (proportional gain and differential gain).

HP gain adjustment circuit 614 applies to the horizontal proportional gain obtained by the V/V 608 an analog voltage that corresponds to the horizontal proportional gain adjustment amount from the buffer 612, and outputs a temperature-adjusted horizontal proportional gain. The $V_P$ gain adjustment circuit 615 applies to the vertical proportional gain obtained by the V/V 609 an analog voltage that corresponds to the vertical proportional gain adjustment amount from the buffer 613, and outputs a temperature-adjusted vertical proportional gain.

The HD gain adjustment circuit 616 applies to the horizontal differential gain obtained by the differential circuit 610 an analog voltage that corresponds to the horizontal differential gain adjustment amount from the buffer 612, and outputs a temperature-adjusted horizontal differential gain. The VD gain adjustment circuit 617 applies to the vertical differential gain obtained by the differential circuit 611 an analog voltage that corresponds to the vertical differential gain adjustment amount from the buffer 613, and outputs a temperature-adjusted vertical differential gain.

As described above, the basic proportional gains and differential gains are temperature-adjusted by the HP gain adjustment circuit 614, the VP gain adjustment circuit 615, the HD gain adjustment circuit 616 and the VD gain adjustment circuit 617.

LPF 618 is a low-pass filter that eliminates high-frequency noises included in the output voltages from the HP gain adjustment circuit 614 and the HD gain adjustment circuit 616. The LPF 619 is a low-pass filter that eliminates high-frequency noises included in the output voltages from the VP gain adjustment circuit 615 and the VD gain adjustment circuit 617.

Driver 620 is an IC (integrated circuit) to drive the motors that supply to the horizontal actuator 62 and the vertical actuator 63 drive voltages corresponding to the output voltages from the LPF 618 and the LPF 619.

The position detection section 7 shown in FIG. 1 comprises a horizontal position detector 71 and a vertical position detector 72. The horizontal position detector 71 comprises such things as an LED mounted to the horizontal shake correction lens 31 and a PSD (position detecting element) that receives the light from the LED. Said detector is used to obtain a signal to detect the position of the horizontal shake correction lens 31 based on the position on the PSD at which the light rays from the LED are received. Similarly, the vertical position detector 72 also comprises such things as an LED and a PSD, and is used to obtain a signal to detect the position of the vertical shake correction lens 32 based on the position on the PSD at which the light rays from the LED are received.

The exposure control section 8 receives the light from the photo object by means of a photoelectric conversion element such as an SPC (silicon photo cell), and detects the brightness of the photo object. It determines the appropriate exposure time (tss) in accordance with the photo object brightness. In addition, the exposure control section 8 starts a timer not shown in the drawing after opening the shutter 23, and closes the shutter 23 when the time elapsed from the start of the timer has exceeded the appropriate exposure time. The shutter 23 opens and closes by means of a shutter drive unit not shown in the drawing in accordance with said opening and closing control.

The camera mode setting section 9 comprises a shutter release button 91 having switches Si and S2 and a mode setter 92. When the shutter release button 91 is pressed halfway down, the switch S1 becomes ON and the photo-taking preparations are carried out. When the shutter release button 91 is pressed all the way down, the switch S2 becomes ON and exposure is carried out.

The mode setter 92 causes the shake sensor controller 43 and shake amount detector 51 to execute processes for low-speed control when the switch S1 is ON. It causes them to execute processes for high-speed control when the switch S2 is ON. In this embodiment, as described above, when the switch S1 is ON, the mode is switched to low-speed control, and when the switch S2 is ON, the mode is switched to high-speed control. Therefore, determination takes place with regard to whether or not the switches S1 and S2 are turned ON. In addition, when the switch S2 is ON, the mode setter 92 gives the shake amount display 12 an instruction to turn OFF all illuminations.

The low-speed control and high-speed control will now be explained. In this embodiment, alternation between low-speed control and high-speed control takes place using clock adjustment. In other words, where the camera is set to low-speed control mode, the shake sensor controller 43 causes the shake sensor 42 to perform a light receiving operation for a prescribed integration period and causes the shake sensor 42 to send the image signal obtained in the light receiving operation to the signal processor 44 using a low-speed clock. The implementation of the present invention is not limited to this, however. It is also acceptable if the image signal obtained by the shake sensor 42 is sent to the signal processor 44 and then dumped in the memory 56 using a high-speed clock, and the execution of prescribed processes is put on hold after said dumping for a prescribed wait period.

On the other hand, where the camera is set to high-speed control, the shake sensor controller 43 causes the shake sensor 42 to perform a light receiving operation for a prescribed integration period and causes the shake sensor 42 to send the image signal obtained in the light receiving operation to the signal processor 44 using a high-speed clock.

In this embodiment, the alternation between low-speed control and high-speed control is performed using clock adjustment, but the implementation of the present invention is not limited to this. It is also acceptable if the alternation is carried out based on whether or not the shake amounts obtained by the shake amount detector 51 are thinned. In this case, the mode setter 92 sets the shake amount detector 51 to perform processing corresponding to either low-speed control or high-speed control. In other words, the shake sensor controller 43 causes the shake sensor 42 to perform a light receiving operation at a high speed at all times, while the shake amount detector 51, when the mode is set to low-speed control, seeks shake amounts using the image data dumped in the memory 56 and sends them to the shake amount display 12 while thinning them. In this case, the number of shake amount transmissions to the shake amount display 12 decreases in accordance with the degree of the thinning. On the other hand, where the mode is set to high-speed control, the shake amount detector 51 seeks shake amounts using the image data dumped in the memory 56 and stores them in the memory 56. The shake amount detector 42 then seeks an estimated shake amount using the shake amounts thus stored without thinning them, and sends it to the coefficient converter 52. By using this construction, control may be alternated between low-speed control and high-speed control based on whether or not the obtained shake amounts are thinned.

It is also acceptable if the thinning of the shake amounts is performed by the shake amount display 12 instead of by the shake amount detector 51.

It is also acceptable if the image data from the signal processor 44 is thinned instead of the shake amounts.

Further, it is also acceptable if the intervals for the receipt of image signals by the shake sensor 42 are set longer instead of thinning the image data. In this case, the shake sensor 42 will perform light receiving operations at longer intervals than in the case of high-speed control.

The distance measurement module 10 comprises an infrared LED (IRED) and one-dimensional PSD that receives light from the LED returning after being reflected by the photo object. It obtains information regarding the object distance based on the position on the PSD at which the light is received. The distance measurement module 10 is not limited to this active method construction, however. An external light passive module comprising a pair of line sensors that receive light from the photo object may be used instead. If an external light passive module is used, the object image is received by means of a pair of line sensors, such that distance measurement data corresponding to the object distance may be sought from the difference between the line sensors with regard to the positions at which the object image is received. Moreover, in place of distance measurement module 10, a focus condition detector that obtains focusing information (amount and direction of defocus) regarding the image recording lens 21.

The focusing mechanism 11 drives the image recording lens 21 to the in-focus position based on the distance information from the distance measurement module 10 or defocus degree information.

The shake amount display 12 comprises a display signal generator 121 and a display 122. The display signal generator 121 seeks the total of a prescribed number of shake amounts sent from the shake amount detector 51 set to low-speed control, and generates a display signal in accordance with said shake amount total. Therefore, this display signal generator 121 operates during low-speed control. In this embodiment, said prescribed number is set to be three. Accordingly, determination is made regarding whether or not three shake amounts have been obtained from the shake amount detector 51.

The display 122 has LEDs of multiple kinds housed in the finder, and illuminates these LEDs in response to the display signals generated by the display signal generator 121. In this embodiment, the horizontal and vertical shake situations are separately displayed, but the implementation of the present invention is not limited to this. It is acceptable if only one of them is displayed or if the shake situation is displayed in terms of a value obtained by synthesizing the horizontal and vertical shake amounts.

FIG. 6 is a drawing showing examples of illumination indicating horizontal shake situations in the display 122. The display 122 has multiple LEDs aligned from the right in the order of blue, green, yellow, orange and red, as shown in part (a) of FIG. 6. If the shake amount total is 50 $\mu$m or lower, the display 122 illuminates the blue LED only. If the total ranges from 50 $\mu$m to 100 $\mu$m, the display 122 illuminates the blue and green LEDs, as shown in part (b) of FIG. 6. If the total ranges from 100 $\mu$m to 200 $\mu$m, the display 122 illuminates the blue, green and yellow LEDs. If the total ranges from 200 $\mu$m to 400 $\mu$m, the display 122 illuminates blue, green, yellow, and orange LEDs. If the total is larger than 400 $\mu$m, the display 122 illuminates all of the LEDs, as shown in part (c) of FIG. 6. In addition, the display 122 turns OFF the illumination of all of the LEDs, as shown in part (d) of FIG. 6, in order to notify the user that the shutter 23 is open, in accordance with an instruction from the mode setter 92 to turn OFF all the LEDs. In the same way as shown in FIG. 6, the display 122 has multiple LEDs aligned from bottom to top in the order of blue, green, yellow, orange and red to indicate the vertical shake situation.

A controller in the exposure control section 8, a controller in the focusing section 11, the shake sensor controller 43, the signal processor 44, the shake amount detector 51, the coefficient converter 52, the target position setter 53, the adjustment gain setter 54, the position data input member 57, the mode setter 92 and the display signal generator 121 each comprise a program that stores the processing instructions described below, and an MPU (microprocessor unit) that executes said program. Said members may comprise one or more MPUs.

The operation of the camera 1 will now be explained.

Figure 7:
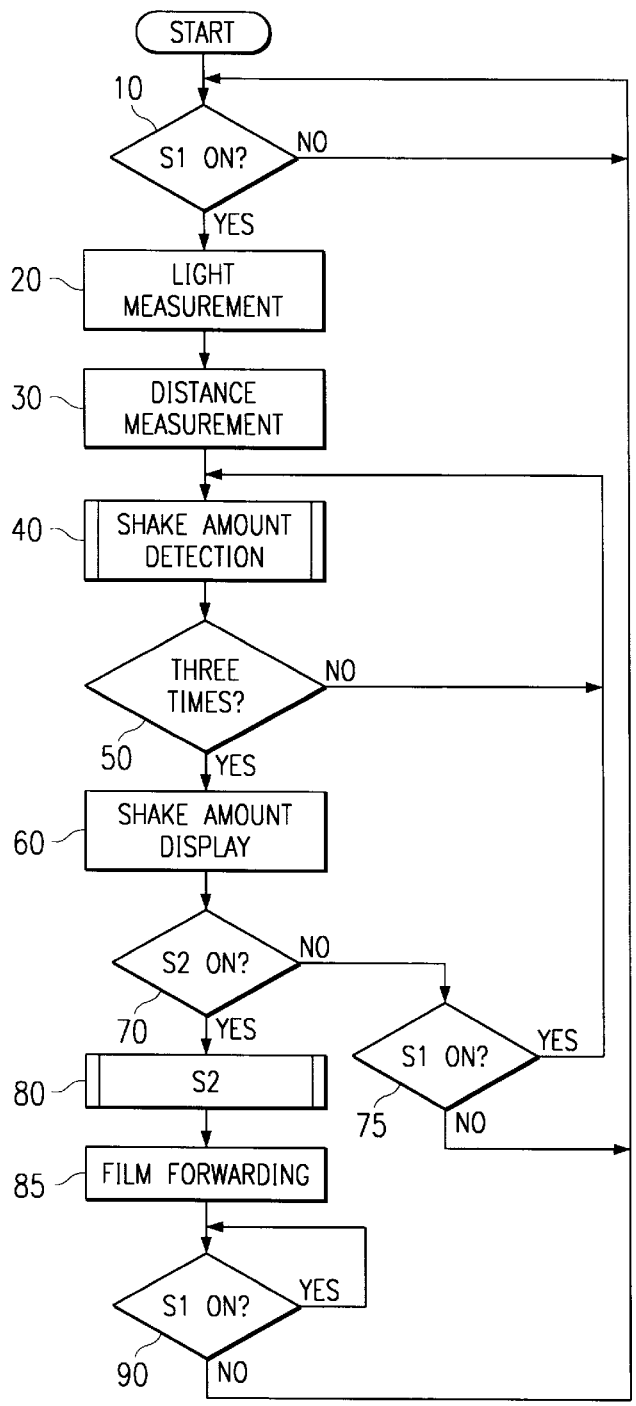
FIG. 7 is a camera control flow chart.

FIG. 7 is a flow chart of the camera 1 control. When the camera 1 shown in FIG. 1 is started by the power switch turning ON, the shutter release button 91 is pressed halfway down, and it is determined whether or not the switch S1 has been turned ON (#10). This determination is repeated until the switch S1 becomes ON.

When the shutter release button 91 is pressed halfway down and the switch S1 becomes ON (YES in #10), the shake sensor controller 43 and the shake amount detector 51 are set to perform processing appropriate for low-speed control. Next, the photo object brightness is detected (light measurement) (#20), and the appropriate exposure time (tss) is determined based on the detected photo object brightness. Distance information is then obtained (#30) and the 'shake amount detection' subroutine is executed (#40).

FIG. 8 is a flow chart showing the 'shake amount detection' subroutine. When this subroutine is called, it is determined whether or not the detection is to be made in high-speed control mode or low-speed control mode, i.e., whether or not the detection is to be made before the switch S2 is turned ON or after it is turned ON (#100).

Since the detection is to be made before the turning ON of the switch S2 here (NO in #100), the image signal obtained in the light receiving operation by the shake sensor 42 is transferred via signal processor 44 as image data to the shake amount detector 51 using a low-speed clock, and is then dumped in the memory 56 (#110). An image dumped in the memory 56 and corresponding to the base image is then extracted as a reference image, and a shake amount expressed in terms of a number of pixels is calculated from the change in the reference image position relative to the base image position (#120). The shake amount thus calculated is sent to the display signal generator 121, and the shake amount is added to the previous shake amounts (#130). The apparatus then returns to the main routine.

It is then determined whether or not shake amount detection has been performed three times (#50 in FIG. 6). If one or two detections have been performed (No in #50), the apparatus returns to step #40. Through this process, the cumulative value of three shake amounts (shake amount total) is obtained. When three detections are completed (YES in #50), a display signal corresponding to this total is generated and sent to the display 122, whereupon display takes place (#60). Through this process, the shake situation is made recognizable.

It is then determined whether or not the shutter release button 91 has been completely pressed down and the switch S2 has become ON (#70). If it is not ON (NO in #70), the cumulative shake amount is reset to '0', and it is determined whether or not the switch S1 is still ON (#75). If it is OFF, the apparatus proceeds to step #10, and if the switch S1 is still ON, the apparatus returns to step #40. While the switch S1 is ON, the shake amount detection and the display of the shake situation updated every three detections are repeated in this way. When the subroutine shown in FIG. 8 is followed the first time, image data necessary to seek a shake amount is not stored in the memory 56 and a shake amount value is not obtained in step #120, and therefore the total becomes '0' in step #130. Because this occurs the first time only, it does not pose any problems to the recognition of the shake situation. However, it is acceptable if a process is followed the first time in which base image data is dumped in the memory 56 to calculate a shake amount prior to the subroutine of FIG. 8.

On the other hand, where the shutter release button 91 has been completely pressed down and the switch S2 has become ON (YES in #70), setting is made such that the shake sensor controller 43 and shake amount detector 51 will execute processes appropriate for high-speed control. After said setting, the 'S2' subroutine is executed (#80).

Figure 9:
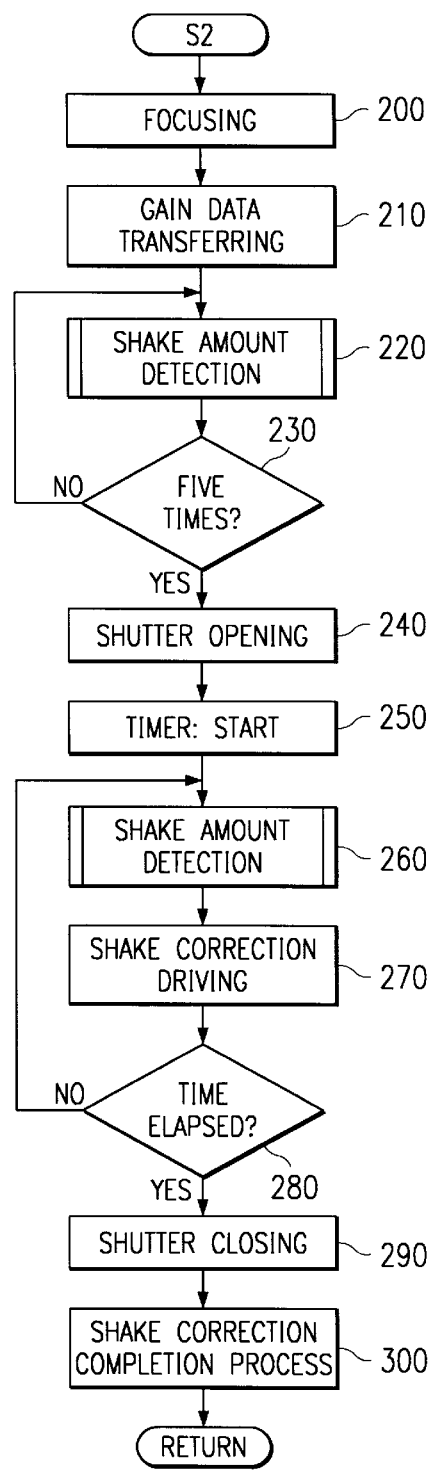
FIG. 9 is a flow chart showing the 'S2' subroutine of FIG. 7.

FIG. 9 is a flow chart showing the 'S2' subroutine. When this subroutine is called, the image recording lens 21 is driven to an in-focus position corresponding to the distance information obtained in step #30 of FIG. 7 (#200).

The horizontal and vertical gain adjustment amounts are then transferred to the drive controller 61 as data $SD_{GH}$ and $SD_{GV}$ in accordance with the ambient temperature detected by the temperature sensor 55 (#210).

The 'shake amount detection' subroutine of FIG. 8 is then called (#220). Since this detection takes place after the turning ON of the switch S2 (YES in #100), the image signal obtained in the light receiving operation by the shake sensor 42 is sent as image data to the shake amount detector 51 via the signal processor 44 using a high-speed clock, and dumped in the memory 56 (#140). An image dumped in the memory 56 and corresponding to the base image is extracted as a reference image, and a shake amount expressed in terms of a number of pixels is calculated from the change in the reference image position relative to the base image position (#150), and is then stored in the memory 56. Shake amounts are then selectively extracted from the memory 56, and the calculation to seek an estimated shake amount is executed (#160). Subsequently, all of the LEDs on the display 122 are turned OFF in accordance with an instruction to do so from the mode setter 92 (#170), whereupon the apparatus returns to the main routine.

It is then determined whether or not 'shake amount detection' in step #220 has been repeated five times (#230). If it hasn't (NO in #230), the apparatus returns to step #220. Through this process, shake amounts required to calculate an estimated shake amount are obtained for both the horizontal and vertical directions, so that an estimated shake amount may be sought from the start using the formula (4) in step #160 of FIG. 8 that is executed after being called in step #260.

Where said detection has been repeated five times (YES in #230), the shutter is instructed to open to start exposure (#240), and a timer to count the appropriate exposure time (tss) obtained in step #20 starts (#250).

When exposure starts, the 'shake amount detection' subroutine of FIG. 8 is called again (#260). Since this is detection after the turning ON of the switch S2 (YES in #100), the image signal obtained in the light receiving operation by the shake sensor 42 is sent as image data to the shake amount detector 51 via the signal processor 44 using a high-speed clock, and is then dumped in the memory 56 (#140). An image dumped in the memory 56 and corresponding to the base image is then extracted as a reference image, and the shake amount expressed in terms of a number of pixels is calculated from the change in the reference image position relative to the base image position (#150), and is then stored in the memory 56. Shake amounts are then selectively extracted from the memory 56, and the calculation to seek an estimated shake amount is executed (#160). All of the LEDs on the display 122 are kept OFF (#170), and the apparatus returns to the main routine.

The horizontal and vertical estimated shake amounts obtained in step #260 are converted into horizontal and vertical target angular positions, respectively, by the coefficient converter 52, and then into horizontal and vertical target positions for the correction lens unit 3 by target position setter 53. The horizontal and vertical target positions are transferred to drive section 6 as data $SD_{PH}$ and $SD_{PV}$, respectively. Through this process, the lenses of the correction lens unit 3 are driven in accordance with the data $SD_{PH}$, $SD_{PV}$, $SD_{GH}$ and $SD_{GV}$ from the target position setter 53 and adjustment gain setter 54 (#270), whereupon shake correction occurs.

It is then determined whether or not the time that elapsed since the start of step #250 has exceeded the appropriate exposure time (tss) (#280). If it has not exceeded the appropriate exposure time (tss) (NO in #280), the apparatus returns to step #260, in which shake correction is continued. If the appropriate exposure time (tss) has been exceeded (YES in #280), an instruction to close the shutter is sent (#290), and the shake correction completion process (fixing of the horizontal shake correction lens 31 and vertical shake correction lens 32 to prescribed positions, and cessation of power supply to the drive section 6) is executed (#300), whereupon the apparatus returns to the main routine and feeds the film forward by one frame (#85 in FIG. 7). The apparatus then waits until the switch S1 becomes OFF (YES in #90). When the switch S1 becomes OFF, the apparatus returns to step #10 again (NO in #90). Subsequently, when the power switch is turned OFF, the processes of this flow chart come to an end.

In this embodiment, a display signal is generated in accordance with the total of the shake amounts obtained in three detections. However, the number of detections is not limited to three. Any number is acceptable so long as the display is updated at time intervals taking into consideration the ease of recognition by the user. A construction may also be used in which a display signal is generated in accordance with an average obtained by dividing the total by the number of detections, or instead of the shake situation, a shake amount value may be displayed.

In this embodiment, an estimated shake amount is sought when high-speed control is present, but it is also acceptable if the correction lens unit 3 is driven in accordance with the shake amounts without seeking an estimated shake amount. In this case, the coefficient converter 52 will be capable of converting the shake amounts into corresponding horizontal and vertical target angular positions.

In this embodiment, the camera instability is detected through image processing using light receiving elements such as CCDs, but the implementation of the present invention is not limited to this. Instead, detection may be made by means of an angular speed sensor or an acceleration sensor. For example, if an angular speed sensor is used, shake amounts will be calculated using lower-frequency signals than usual only so that the shake amounts will be displayed accordingly, while shaking over the entire frequency range will be detected for use in shake correction. Specifically, the cut-off frequency of a low-pass filter will be alternated between one for display and another for detection.

Further, low-speed control and high-speed control are alternated depending on the status of the shutter release button 91, but they may be alternated depending on the exposure status instead. For example, low-speed control may be set to be present except for during exposure. During low-speed control in this case, the dumping of image data into the memory 56 will be performed at a low speed so that the shake situation may be displayed as a total of multiple shake amounts. Alternatively, instead of using a low-speed data dump, the camera instability may be detected at longer intervals than during exposure, or the image data obtained to seek shake amounts or the shake amounts obtained may be thinned. On the other hand, during exposure, because shake correction needs to keep up with the hand shake, the camera will be set to high-speed control, so that thinning will not be performed, the detection intervals will be shorter than for other operations than exposure, and the data dump will also be performed at a high speed.

Moreover, the shake amount detector 51 may update the base image to seek shake amounts during low-speed control. In this case, the correction lens unit 3 is not driven because shake correction is not executed. Therefore, where the reference image positions that are sequentially detected stop changing after deviating from the base image position, if a reference image position detected after said stoppage deviates from the base image position, a shake amount is detected even though it did not change from the previous reference image position. If the base image is updated and replaced with the image data immediately prior to the latest image data, for example, such a shake amount will not be detected and a shake amount that corresponds to the actual instability can be obtained at all times.

Figure 10:
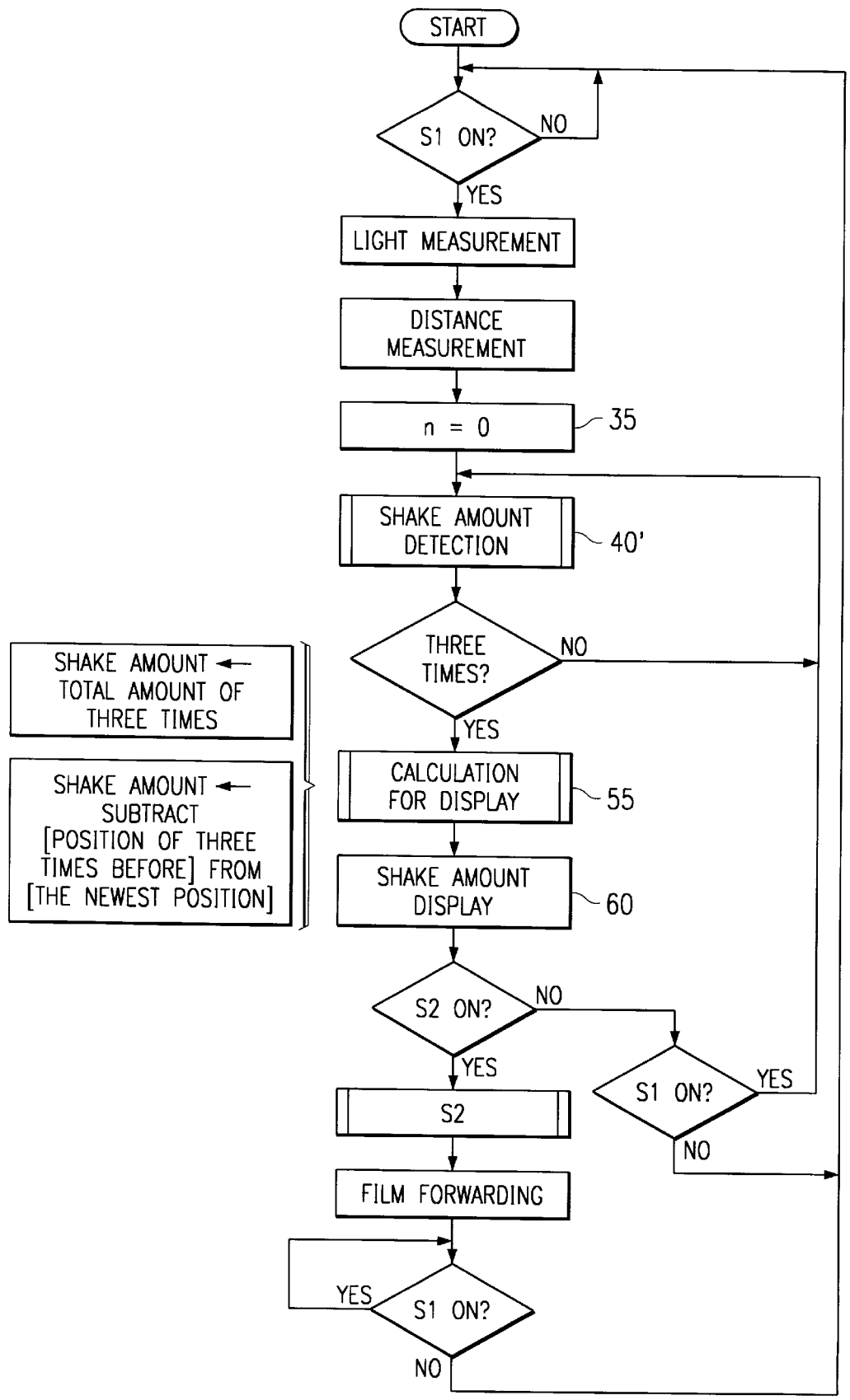
FIG. 10 is a camera control flow chart of a modified embodiment.

Next, a modified embodiment will be described. FIG. 10 shows a modified flowchart of FIG. 7, and FIG. 11 shows a modified flowchart of FIG. 8 which is executed at step #40' of FIG. 10. FIG. 10 is different from FIG. 7 in steps #35 and #55. FIG. 11 is different from FIG. 8 in steps #95, #105 #115 and #135. The sequence 'S2' of this modified embodiment is the same as FIG. 9 so that the description thereof will be omitted.

In step #35, a variable 'n' is set as '0'. This variable is incremented by one at step #95 of FIG. 11. When the switch S2 is not on, it is discriminated whether 'n' is an even number or not at step #105 of FIG. 11. If the discrimination result is affirmative, the sequence skips steps #110–130 and jumps to step #135 via step #115. At steps #115 and #135, there is a prescribed wait time. If the discrimination result is negative at step #105, the sequence executes steps #110–130. Thus, the steps #110–130 are executed at every two times before the switch S2 is turned on. Accordingly, the shake amount detection is executed using longer cycles.

In contrast, the shake amount detection is performed using shorter cycles when the switch S2 is on.

Additionally, while the switch S2 is not on, since the sequence a prescribed wait time at steps #115 and #135, the shake amount detection is executed using further longer cycles.

Next, step #55 of FIG. 10 will be described.

One example of step #55 is that shake amount is obtained by adding total shake amount of three times. The added shake amount is used for the shake amount display at step #60. Alternately, at step #55, the shake amount is obtained by subtracting position data of an image three times before from the newest position data of image. Thus, the thinned data are used for shake amount display.

Using the above embodiments, depending on whether the camera is operating in accordance with the first set of parameters or the second set of parameters, the suitable operation mode can be selected in determining the value to be used in the shake detection operation and the process regarding camera instability.

Further, using the embodiments, shake detection and/or determination of values for the purpose of displaying on the display take place in a first mode and shake detection and/or determination of values to operate the shake correction mechanism take place in a second mode. Accordingly, shake detection and/or determination of values appropriate for the display are carried out in the first mode, and shake detection and/or determination of values appropriate for shake correction can be carried out in the second mode.

While each embodiment described above is a camera using film, the present invention may be used in a digital camera or a video camera that uses image recording elements. Further, the present invention is not limited to cameras. It may be used in any apparatus having a shake correction function.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus comprising:
   a detector having a shake sensor for detecting a movement of said apparatus;
   a calculator for determining a shake value to be used to perform processing regarding an instability of said apparatus using the movement detected by said detector;
   and
   a mode selector for switching between a first mode and a second mode, wherein in said first mode at least one of said detector and said calculator is caused to operate in accordance with a first set of parameters allowing the shake detection to be performed using longer cycles than in said second mode, and wherein in the second mode at least one of said detector and said calculator is caused to operate in accordance with a second set of parameters different from said first set of parameters.

2. An apparatus according to claim 1 further comprising:
   a display for displaying said shake value; and
   a shake correction mechanism for performing shake correction by using said shake value;
   wherein in the first mode, said apparatus displays said shake value on said display without said shake correction mechanism performing shake correction, and
   wherein in the second mode, said apparatus displays said shake value on said display and said shake correction mechanism performs shake correction.

3. An apparatus according to claim 2, wherein, during the display in the first mode, the shake value is updated slowly to facilitate easier reading.

4. An apparatus according to claim 2, wherein, during the display in the first mode, the determination of said shake value is carried out using multiple items of shake information detected by said detector.

5. An apparatus according to claim 2, wherein, during the display in the first mode, the speed at which the shake information detected by said detector is transmitted to said calculator is slower than in said second mode.

6. An apparatus according to claim 2, wherein, during the display in the first mode, the shake information detected by said detector is thinned, and said shake value is determined using the thus thinned shake information.

7. An apparatus according to claim 1, wherein said calculator calculates an estimated shake amount as the shake value to be used when performing processing while in said second mode.

8. An apparatus according to claim 1, wherein said apparatus is a camera, and said mode selector switches from the first mode to the second mode in response to an instruction to begin exposure.

9. A camera comprising:
- a detector having a shake sensor for detecting a movement of said camera relative to an object to be photographed;
- a correction lens unit which can move so as to correct image shake caused by camera movement;
- a calculator for determining a shake value to be used to move said correction lens unit for an image shake correction using the movement detected by said detector;
- a controller for controlling said camera so as to initiate a photographing; and
- a mode selector for switching between a first mode and a second mode,
- wherein, in said first mode, at least one of said detector and said calculator operates in accordance with a first set of parameters before said controller initiates the photographing, so that shake detection is performed using longer cycles than in said second mode, and
- wherein in said second mode at least one of said detector and said calculator operates in accordance with a second set of parameters different from said first set of parameters after said controller initiates the photographing.

10. A camera according to claim 9 further comprising a display for displaying said shake value;
- wherein in the first mode, said camera displays said shake value on said display without said correction lens unit moving to correct image shake, and
- wherein in the second mode, said camera displays said shake value on said display and said correction lens unit moves to correct image shake.

11. A camera according to claim 10, wherein, during the display in the first mode, shake value is updated slowly to facilitate easier reading.

12. A camera according to claim 10, wherein, during the display in the first mode, the determination of said shake value is carried out using multiple items of shake information detected by said detector.

13. A camera according to claim 10, wherein, during the display in the first mode, the speed at which the shake information detected by said detector is transmitted to said calculator is slower than in said second mode.

14. A camera according to claim 10, wherein, during the display in the first mode, the shake information detected by said detector is thinned, and a shake value is determined using the thus thinned shake information.

15. A camera according to claim 9, wherein said calculator calculates an estimated shake amount as the shake value to be used in shake correction, while in said second mode.

16. A camera according to claim 9, wherein said correction lens unit has a horizontal shake correction lens and a vertical shake correction lens that are located in front of an image recording lens.

17. A camera according to claim 16, wherein said correction lens unit corrects camera shake through refraction.

18. A camera according to claim 16, wherein said horizontal shake correction lens and said vertical shake correction lens have an optical axis which is parallel to an optical axis of said image recording lens.

19. A camera according to claim 18, wherein said horizontal shake correction lens and said vertical shake correction lens are supported on a plane which is perpendicular to said optical axis of said image recording lens such that said horizontal shake correction lens and said vertical shake correction lens can move perpendicularly to each other.

20. An apparatus comprising: a detector having a shake sensor for detecting a movement of said apparatus;
- a calculator for determining a shake value to be used to perform processing regarding an instability of said apparatus using the movement detected by said detector;
- a controller for performing processing regarding said instability using said shake value; and
- a mode selector for switching between a first mode and a second mode, wherein in said first mode shake detection is performed and said shake value is displayed in a display without said controller performing processing regarding said instability using said shake value, and wherein in the second mode shake detection is performed, said shake value is displayed in a display, and said controller performs shake correction.

21. An apparatus according to claim 20, wherein, during said display in said first mode, said shake value is updated slowly to facilitate easier reading.

22. An apparatus according to claim 20, wherein, during said display in said first mode, the determination of said shake value is carried out using multiple items of shake information detected by said detector.

23. An apparatus according to claim 20, wherein, during said display in said first mode, the speed at which the shake information detected by said detector is transmitted to said calculator is slower than in said second mode.

24. An apparatus according to claim 20, wherein, during said display in said first mode, the shake information detected by said detector is thinned, and said shake value is determined using the thus thinned shake information.

25. An apparatus according to claim 20, wherein said calculator calculates an estimated shake amount as the shake value to be used when performing processing while in said second mode.

26. An apparatus according to claim 20, wherein said apparatus is a camera, and said mode selector switches from said first mode to said second mode in response to an instruction to begin exposure.

* * * * *